(12) United States Patent
Behrendt et al.

(10) Patent No.: US 9,546,816 B2
(45) Date of Patent: Jan. 17, 2017

(54) METHOD AND DEVICE FOR THE AIR-BASED SOLAR THERMAL GENERATION OF PROCESS HEAT

(75) Inventors: Burkhard Behrendt, Bad Hersfeld (DE); Karl Friedrich Lang, Bad Hersfeld (DE)

(73) Assignee: Grenzebach BSH GmbH, Bad Hersfeld (DE)

( * ) Notice: Subject to any disclaimer, the term of this patent is extended or adjusted under 35 U.S.C. 154(b) by 627 days.

(21) Appl. No.: 13/699,554

(22) PCT Filed: May 26, 2011

(86) PCT No.: PCT/DE2011/001114
§ 371 (c)(1),
(2), (4) Date: Nov. 21, 2012

(87) PCT Pub. No.: WO2012/025073
PCT Pub. Date: Mar. 1, 2012

(65) Prior Publication Data
US 2013/0061493 A1 Mar. 14, 2013

(30) Foreign Application Priority Data
Jun. 2, 2010 (DE) .......................... 10 2010 022 517

(51) Int. Cl.
*F26B 3/02* (2006.01)
*F24J 2/22* (2006.01)
(Continued)

(52) U.S. Cl.
CPC ................ *F26B 3/02* (2013.01); *F24J 2/0488* (2013.01); *F24J 2/07* (2013.01); *F24J 2/16* (2013.01);
(Continued)

(58) Field of Classification Search
CPC ............ F26B 3/02; F24J 2/0488; F24J 2/0494
(Continued)

(56) References Cited

U.S. PATENT DOCUMENTS 3,919,998 A * 11/1975 Parker ................... F24J 2/0477
126/593
3,939,819 A * 2/1976 Minardi ..................... F24J 2/23
126/665
(Continued)

FOREIGN PATENT DOCUMENTS

DE 197 44 541 A1 10/1997
DE 199 52 174 A1 5/2001
(Continued)

OTHER PUBLICATIONS

Strumpf, et al, High-Temperature Ceramic Heat Exchanger Element for a Solar Thermal Receiver, 1982, American Society of Mechanical Engineers, Journal of Solar Energy Engineering, vol. 104, p. 305.*

(Continued)

*Primary Examiner* — Kenneth Rinehart
*Assistant Examiner* — Logan Jones
(74) *Attorney, Agent, or Firm* — Brinks Gilson & Lione

(57) ABSTRACT

A device is provided for the air-based solar thermal generation of process heat in order to assist in drying processes. The device may add the solar-thermally generated hot air as a function of the relative temperature of the solar-thermally generated hot air as a partial flow of the process air generated by other systems.

14 Claims, 9 Drawing Sheets

(51) Int. Cl.
F24J 2/34 (2006.01)
F24J 2/16 (2006.01)
F24J 2/04 (2006.01)
F24J 2/07 (2006.01)

(52) U.S. Cl.
CPC .. *F24J 2/22* (2013.01); *F24J 2/34* (2013.01); *F28F 2250/08* (2013.01); *Y02E 10/41* (2013.01); *Y02E 10/44* (2013.01)

(58) Field of Classification Search
USPC ........ 34/93, 443; 285/122.1, 125.1; 454/261
See application file for complete search history.

(56) References Cited

U.S. PATENT DOCUMENTS

| | | | |
|---|---|---|---|
| 4,036,208 A * | 7/1977 | Bauer | F24J 2/268 126/658 |
| 4,074,678 A | 2/1978 | Posnansky | |
| 4,099,338 A * | 7/1978 | Mullin | F26B 3/286 126/616 |
| 4,325,359 A * | 4/1982 | Fries | F24J 2/14 126/678 |
| 4,490,926 A * | 1/1985 | Stokes | F26B 3/286 34/76 |
| 5,080,403 A * | 1/1992 | Paoluccio | F16L 41/00 285/189 |
| 5,606,201 A * | 2/1997 | Lutz | F28F 13/02 257/714 |
| 6,003,508 A | 12/1999 | Hoffschmidt et al. | |
| 6,516,794 B2 | 2/2003 | Karni et al. | |
| 2006/0117646 A1 * | 6/2006 | Dai | A01M 1/023 43/139 |
| 2008/0092877 A1 * | 4/2008 | Monsebroten | F21S 11/00 126/683 |
| 2008/0131830 A1 * | 6/2008 | Nix | F24D 5/00 432/220 |
| 2009/0056699 A1 | 3/2009 | Mills et al. | |
| 2009/0090109 A1 * | 4/2009 | Mills | F24J 3/081 60/659 |
| 2009/0250052 A1 | 10/2009 | Gilon et al. | |
| 2011/0180059 A1 | 7/2011 | Selig et al. | |

FOREIGN PATENT DOCUMENTS

| | | |
|---|---|---|
| DE | 100 65 485 A1 | 7/2002 |
| DE | 102 57 458 A1 | 6/2004 |
| EP | 0 495 395 A1 | 7/1992 |
| EP | 2 161 516 A1 | 3/2010 |

OTHER PUBLICATIONS

Van Ormer, et al, Unique Piping Design Reduces Beverage Bottler's Electric Energy Bill, Aug. 14, 2009, Plant Services.*
DE102006005099, Aug. 2006, Germany, Stefanakis, English translation.*
German Office Action for Serial No. 10 2010 022 517.7, dated Sep. 28, 2011 and English Translation.
International Search Report and Written Opinion, International Application No. PCT/DE2011/001114, Dated Dec. 16, 2013.

* cited by examiner

METHOD AND DEVICE FOR THE AIR-BASED SOLAR THERMAL GENERATION OF PROCESS HEAT

CROSS REFERENCE TO RELATED APPLICATIONS

This application is a national stage application under 35 U.S.C. 371 of international application number PCT/DE2011/001114 filed May 26, 2011 (WO 2012/025073 A2) and also claims priority to German application number 10 2010 022 517.7 filed Jun. 2, 2010, all of which are hereby incorporated by reference in their entirety.

SUMMARY

The invention relates to a method and a device for the solar thermal generation of process heat in the temperature range of from 300° C. to 700° C.

Many solar thermal plants are known, which for the most part operate with water or thermal oil as a fluidic transfer medium for the captured solar energy. In this case, the solar radiation is concentrated onto a usually linear radiation center in the form of a steel tube through which a fluid flows. The steel tube may be enclosed by a vacuum-tight transparent glass tube. Another design consists of a thermally insulated, so-called receiver tube in an elongated box which has a transparent glass pane on the front side and, on the inside, a linear mirror which directs the incident radiation onto the rear side of the steel tube.

If only air is envisioned as the transfer medium, however, simple flat collectors are mostly used for the low-temperature range (about 100° C.) and so-called heliostats are mostly used for the high-temperature range. These are usually a multiplicity of mirrors which concentrate the solar radiation onto a receiver operating with air on a tower. The air flowing through such an air receiver reaches temperatures of 1200° C.

The following documents, inter alia, are known from the patent literature in relation to the prior art. DE 100 65 485 A1 describes a central solar receiver having an axisymmetric housing and having, on the front side facing toward the sun, an opening which is closed by a window. The object of this document is to provide a new window for use in a central solar receiver, and a new type of central solar receiver in which this window is used. To this end, a volumetric solar absorber is integrated into the housing in such a way that the pressurized working fluid can interact with the volumetric absorber. The working fluid used in this central solar receiver is preferably a gas, for example air, which is suitable for circulating at high temperatures (about 500° C. or more) and at increased pressures of at least about two atmospheres in the receiver chamber. Operation with air at a relatively low pressure is not provided for.

DE 102 57 458 A1 discloses a solar thermal receiver unit comprising a shaped ceramic body, and a method for the production of corresponding ceramic bodies. The object of this laid-open specification is to provide a shaped ceramic body as an absorber body which has an increased lifetime, is easy to produce on an industrial scale and is effective in operation. In order to achieve this object, it is essentially claimed that, in an edge region of the shaped body, the length of the channels which permit a medium to flow through the shaped body decreases continuously or in stages from the middle to the edge.

The special configuration of an absorber body, however, merely represents the solution to a partial problem which relates to the technical solar generation of process heat.

DE 199 52 174 A1 relates to a receiver for concentrated solar radiation for carrying out high-temperature processes. In the processes considered in this case, the use of falling-film absorbers for melting salt is considered, the energy resulting from the salt melting being used to generate water vapor. Environmentally unfriendly vapors are thereby formed. In this case, it is therefore necessary to operate with closed receivers. The configuration of such a receiver is described in this document. Although the melting of salt entails temperatures in the range of from 500° C. to 600° C., which would be of interest for use as usable process heat, the heating of air is not a primary consideration in this case.

It is therefore an object of the method according to the invention, and the corresponding device, respectively to provide a method and a device for the air-based solar thermal generation of process heat, with which an arbitrarily connectable, environmentally friendly and economical source for the generation of process heat is provided.

The device according to the invention will be described in more detail below. In detail:

DETAILED DESCRIPTION

Figure 1:
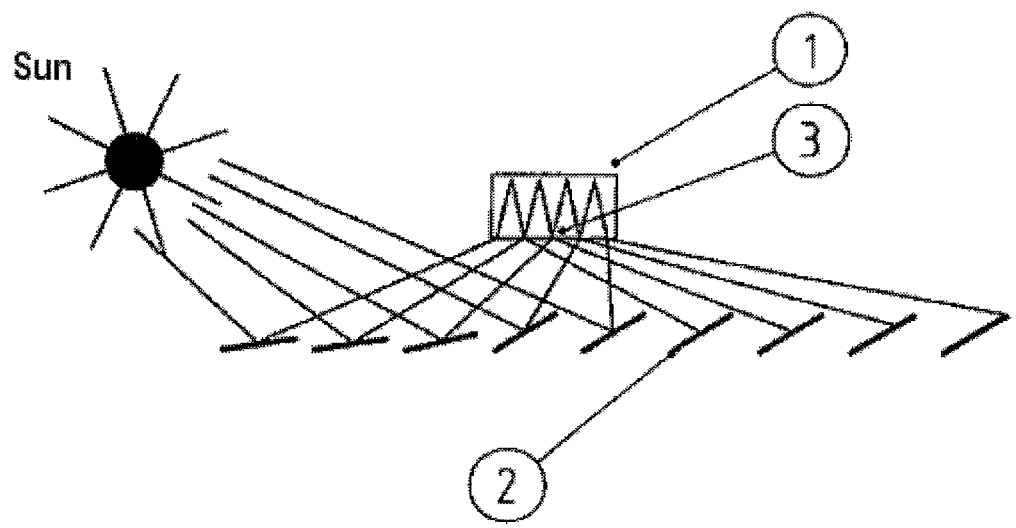
FIG. 1 shows an outline overview of the heat generation according to the invention.

The outline overview of the heat generation according to the invention, as represented in FIG. 1, shows a Fresnel mirror collector field 2 from which concentrated sunrays strike the heat-absorbing surface of a heat exchanger 3 in an air receiver 1.

Figure 2:
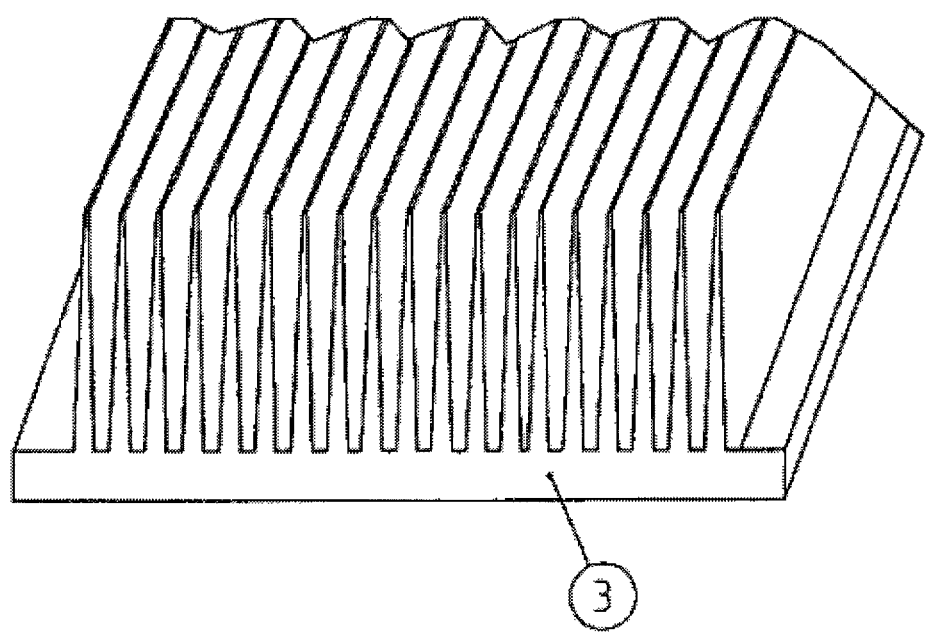
FIG. 2*a* shows a perspective representation of a heat exchanger.
FIG. 2*b* shows a representation of special radiation-absorbing surfaces of heat exchangers.

FIG. 2*a* shows the perspective representation of a heat exchanger 3 corresponding to the representation in FIG. 1.

Figure 2B:
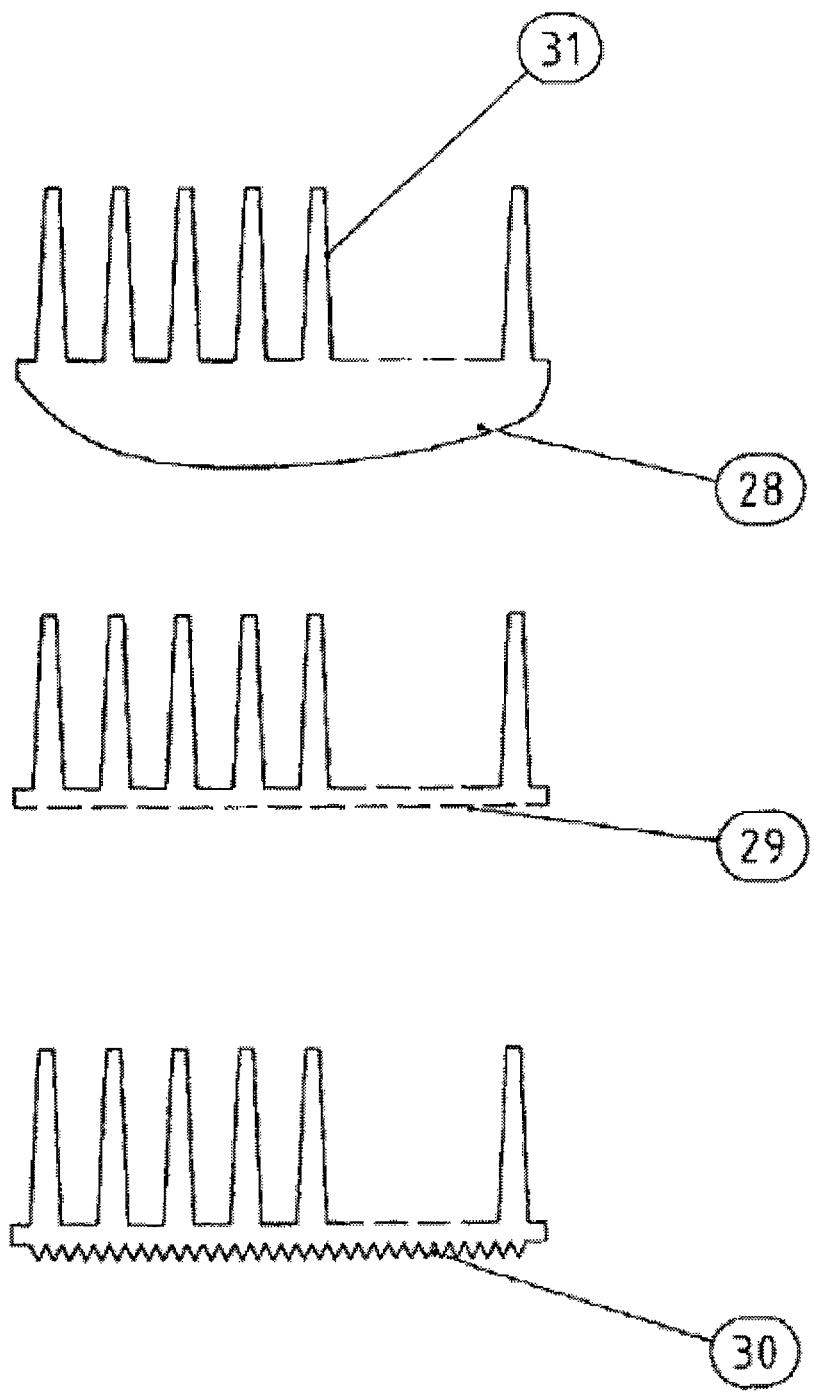

FIG. 2*b* shows the representation of special radiation-absorbing surfaces of heat exchangers 3 as respectively different configurations of these surfaces. A receiver surface, which owing to its special curvature is particularly suitable for use in trough collectors, is represented here by 28. In the example 29 shown underneath, the dashed representation is intended to show that this surface is configured to be highly porous in order to offer minimal reflection for a special application of the sunrays. The last example 30 shown here is designed particularly for use in a Fresnel mirror collector. The purpose of the "serrated" structure which can be seen in this case is that each subsurface placed at an angle to one another is respectively assigned to one mirror of the Fresnel mirror collector.

Figure 3:
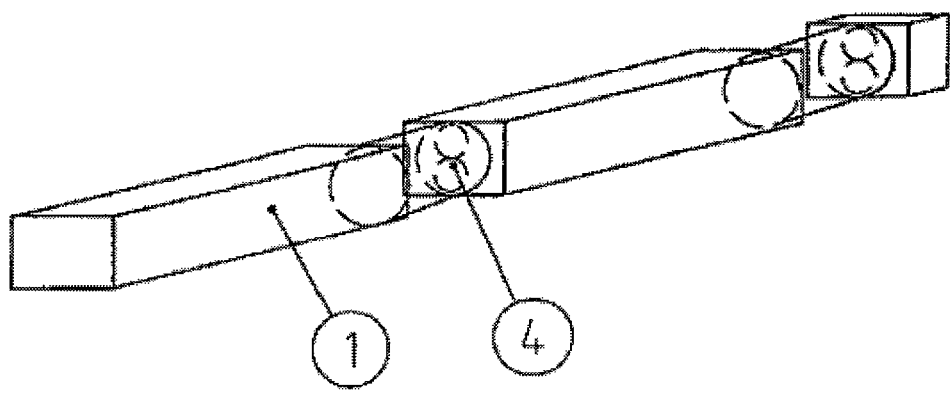
FIG. 3 shows a representation of an air receiver field.

FIG. 3 shows the representation of an air receiver field. The box-shaped container in the perspective representation represents an air receiver 1 in which a fan is denoted by 4. The other fan indicated there does not have a reference. For reasons of clarity, the heat exchangers are not indicated. They are located in the space which is not occupied by the fans 4.

Figure 4:
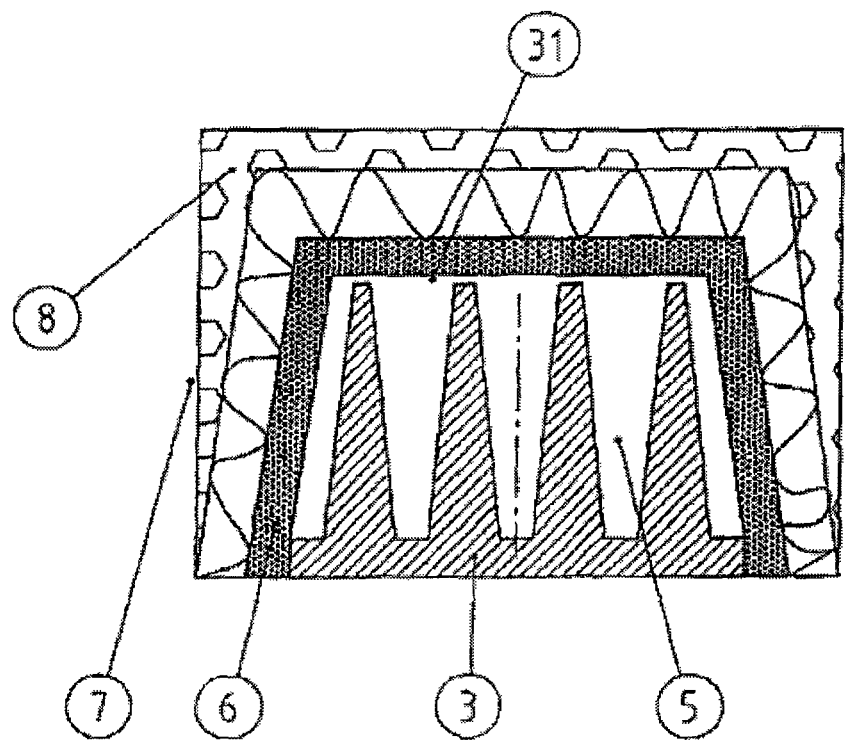
FIG. 4 shows a cross section through a heat exchanger.

FIG. 4 shows a cross section through an air receiver 1. In the middle, there is the actual heat exchanger 3, here merely represented by shading with a straight radiation-absorbing surface. Furthermore, the free space between the dentate configurations of this heat exchanger 3 is arranged for the purpose, on the one hand, of allowing the air flowing through to contact with the heat exchanger 3 heated by the sunrays over a large area, and on the other hand to impede this air as little as possible when it flows through. The free space 5 is delimited by a high temperature-stable insulating material 6. There are suitable industrial products for this purpose, but sand packing between two walls of metal plate is substantially more economical in this case. This insulating material is followed by a layer of a further thermally stable insulating material 7 and an insulating material 8. The outer dimensions of this heat exchanger 3 correspond to the cross section shown in FIG. 2 for the air receiver 1. The heat exchangers 3 are arranged behind one another in an air receiver 1. They may have a groove on one side and on the other side a spring having dimensions corresponding thereto, so as to be connected to one another essentially in a plug-in fashion. In this way, the mechanical strength of the air receiver 1 is increased and the heat transfer resistance between two successive heat exchangers 3 is reduced.

Above all, $Al_2O_3$ (aluminum oxide) is suitable as the material for a heat exchanger. Graphite is also to be mentioned for this purpose. It has a very good thermal conductivity and can be used for temperatures greatly in excess of 1000° C. The ceramic ribs of a heat exchanger 3 also serve overall as a short-term heat store when, for example, the insolation is temporarily blocked. Another possibility for storing heat is provided by the proposed sand packing in the region of the layer 6 of the high temperature-stable insulating material.

In order to reduce the frictional resistance of the surfaces over which turbulent flow takes place inside an air receiver 1, the surfaces with which the air flow comes in contact may be configured with a sharkskin structure 31. The so-called riblets applied in this case consist of fine ribs which have a very sharp rib tip. In FIG. 2B, a thermally conductive "tip" of the heat exchanger 3 is therefore also denoted by 31.

Figure 5:
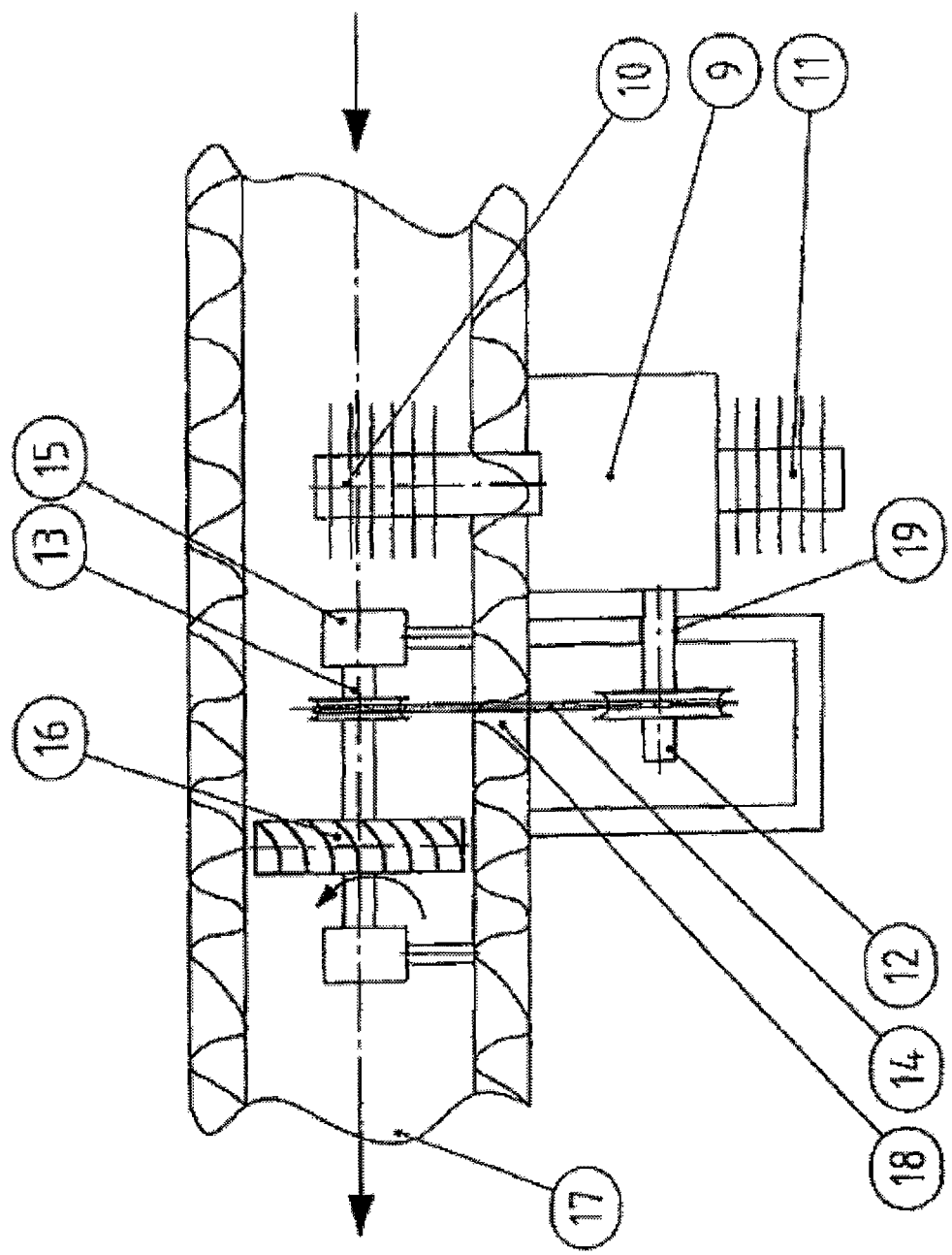
FIG. 5 shows a cross section of a fan drive.

FIG. 5 represents the cross section of a fan drive in an air receiver 1. There is no heat exchanger 3 in this region. In the cross section represented, only the insulation is shown as an outer boundary for the air receiver 1. The fan rotor wheel 16 is driven via a drive belt 14 by means of a Stirling engine 9. The sealing bearing 19 supports the drive shaft 12 of this engine. The hot cylinder 10 of the Stirling engine 9 lies in the hot air flow inside the air receiver 1, and the cold cylinder 11 is exposed to the cold external air. The fan rotor wheel 16 is mounted with its drive shaft 13 in two bearings 15. These bearings are configured to be thermally stable, for example as carbon bearings. The drive belt 14 transmits the drive energy of the Stirling engine 9 from the drive shaft 12 by means of a belt pulley onto the drive shaft 13 of the fan, likewise by means of a belt pulley. An insulation penetration 18 provides the freedom of movement of the drive belt 14. The arrow direction indicates the direction of the air flow 17.

Figure 6:
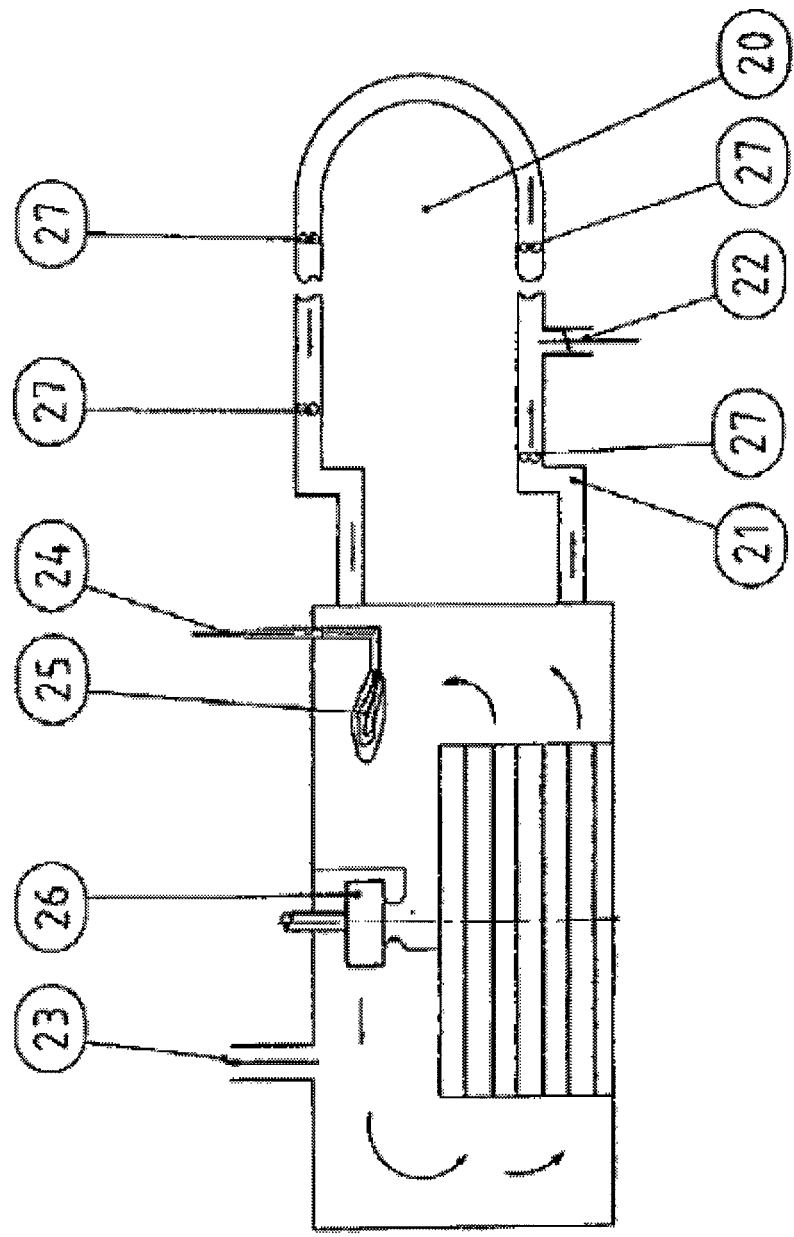
FIG. 6 shows exemplary schematic coupling of the process heat generated according to the invention to a dryer field.

FIG. 6 represents the exemplary schematic coupling of the process heat generated according to the invention to a dryer field. This dryer field is a part of a much more extensive plant for drying gypsum plates. It comprises the fresh air supply 24 for the gas burner 25 as well as the connection 23 for the moisture-laden discharge air of a dryer field and the circulation fan 26 of a dryer field. The line denoted by 21 stands by way of example for the supply of a partial flow of heated air from the plant according to the invention to said plant for drying gypsum plates.

The fresh air supply for a solar field is denoted by 22 in this figure, and a fan of such an air receiver is denoted by 27. In this case, air is not only to be regarded as pure air, but also moisture-laden air (for example 50 to 300 $g/kg_{dry\ air}$). The purpose of the plant is to heat the air (partial flow of the circulation air (FIG. 6) and fresh air FIG. 6, reference 22 into ranges of from 500° C. to 700° C. The initial temperature is about 30° C. (fresh air) or about 150 to 200° C. recycled air from the dryer. At the start of the heating process, the air temperature reached is still low. This means that the concentration factor (the area of the mirror field in relation to the absorption area on the air receiver 1) is still small. With an increasing air temperature, however, the concentration factor must increase so that high temperatures can be achieved at the air receiver. This means that, for a constant mirror area, the air receiver must be smaller in order to reach the desired higher temperatures. It is therefore expedient to arrange the air receivers behind one another in staged sizes.

Figure 7:
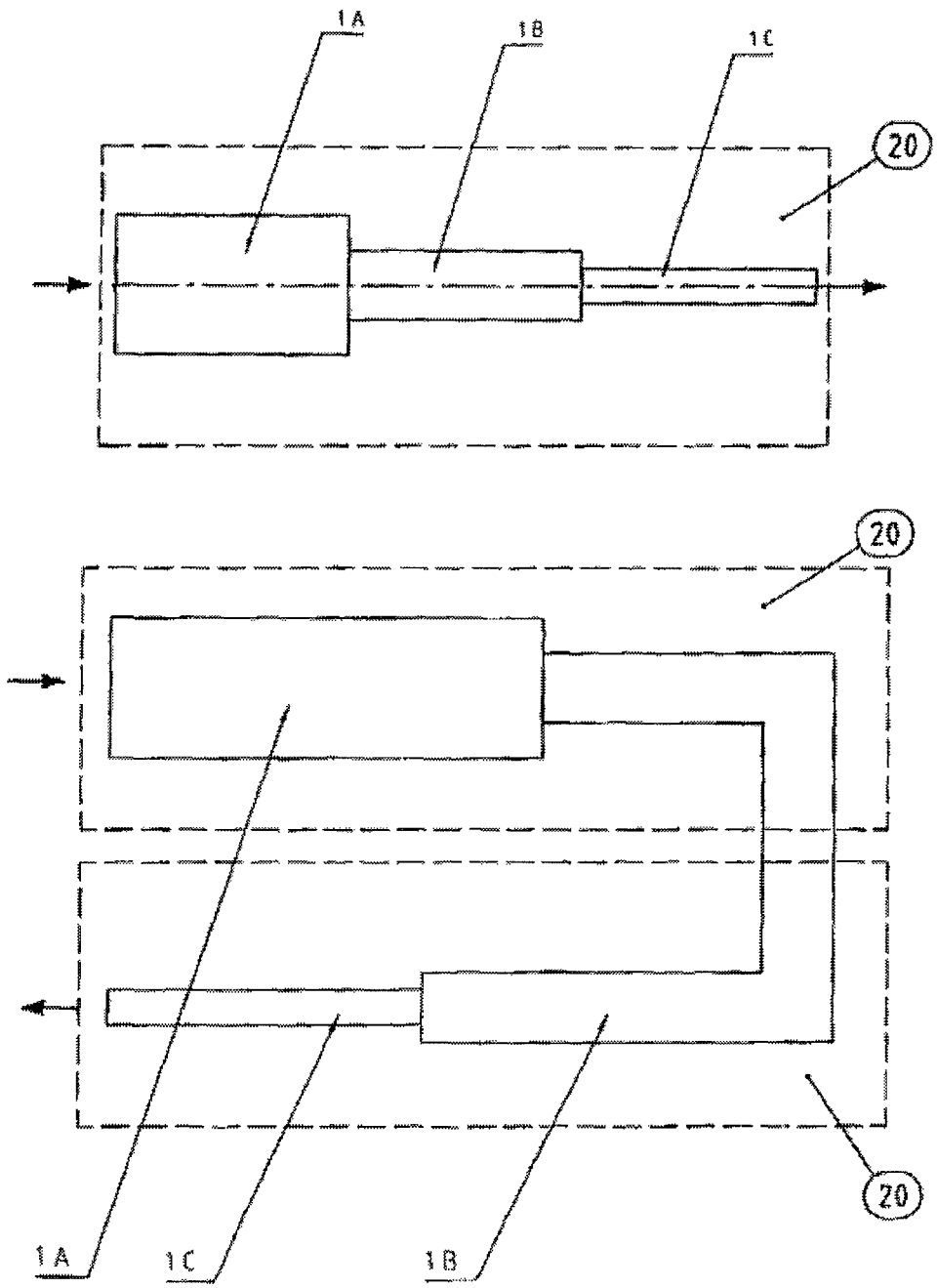
FIG. 7 shows an arrangement of air receivers having a different radiation concentration.

FIG. 7 represents such an arrangement of air receivers having a different radiation concentration. The references 1A, 1B and 1C correspond to different stages of the radiation concentration. The individual air receivers 1 have the same structure, and merely their geometrical dimensions vary in terms of width and height. 1A denotes for example a receiver for a low radiation concentration (50 times), 1B denotes for example a radiation concentration of 80 times intensity and 1C of 110 times intensity. 20 respectively denotes a solar field without the representation of a mirror system. The upper part of FIG. 7 shows three receivers in a linear arrangement, and the lower part of FIG. 7 shows three receivers in an angled form and irradiation by two solar fields.

Figure 8:
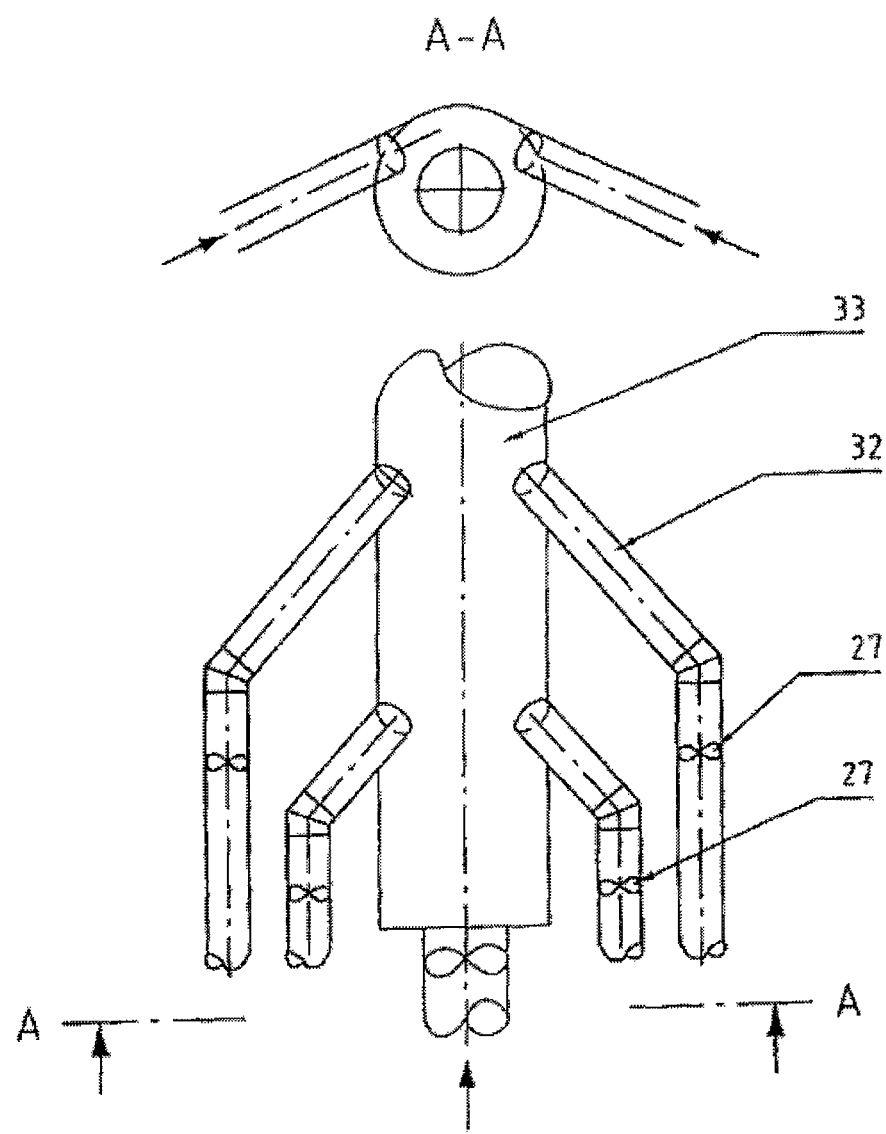
FIG. 8 shows an arrangement for the combination of air receivers.

FIG. 8 shows an arrangement for the combination of a multiplicity of small air receivers, which are denoted in a bent form by 32 and which comprise at least one fan 27. Here, the hot air generated is combined in a main collection tube 33. The air feeds of the individual air receivers 32 lead at an angle into the main tube in order to utilize the upthrust forces of the rising air. In another variant (not additionally represented here), one of the mutually opposite air receivers 32 shown in pairs still enters the main collection tube 33 at a slight angle, but below the central transverse axis thereof. In addition, two mutually opposite air receivers 32 may be offset in terms of their tangential entry points relative to the longitudinal axis of the main collection tube 33. In this way, an additional rotation in the direction of the receiver 32 flanged-on above is imparted to the air flowing in from the two receivers 32, which accelerates the dynamics of the flowing hot air.

The control of the inclination of the mirrors of the collector field and the regulation of the air flows 20 require a special control program.

As a person skilled in the art will readily appreciate, the above description is meant as an illustration of implementation of the principles this application. This description is not intended to limit the scope of this application in that the invention is susceptible to modification, variation and change, without departing from the spirit of this application, as defined in the following claims.

LIST OF REFERENCES 1 air receiver (1A, 1B, 1C)
2 Fresnel mirror collector field
3 heat exchanger
4 fan
5 free space for the through-flow of air
6 high temperature-stable insulating material
7 thermally stable insulating material
8 insulating material
9 Stirling engine
10 hot cylinder
11 cold cylinder
12 drive shaft with belt pulley
13 drive shaft for fan
14 drive belt
15 bearing
16 fan rotor wheel
17 air flow
18 insulation penetration
19 sealing bearing
20 solar field, without mirror system
21 line for a partial flow of heated air
22 fresh air supply for a solar field
23 moisture-laden discharge air of a dryer field
24 fresh air supply for the gas burner of a dryer field
25 gas burner of a dryer field
26 circulation air fan of a dryer field
27 fan of an air receiver
28 radiation-absorbing surface of a heat exchanger
29 radiation-absorbing surface of a heat exchanger
30 radiation-absorbing surface of a heat exchanger
31 coating with artificial sharkskin
32 bent air receiver
33 main collection tube

The invention claimed is:

1. A device for air-based solar thermal generation of process heat in order to assist drying processes in a temperature range of from 300° C. to 700° C., having the following features:
   a) at least one elongated collector in the form of a mirror system, a first elongated collector forming a first solar field of concentrated solar radiation on a first chamber of a first size, a second elongated collector forming a second solar field of concentrated solar radiation of a second chamber of a second size, the first chamber being larger than the second chamber,
   b) at least three air receivers having a different radiation concentration are arranged in series in sections, the at least three air receivers having the configuration of an air channel in which at least one linearly structured heat exchanger comprising ceramic is arranged, wherein the at least three air receivers are in an angled arrangement and heated by more than one solar field,
   c) the heat exchanger is insulated against radiant heat emission by an insulating cladding,
   d) solar-thermally generated hot air is added as a function of the solar-thermally generated hot air's respective temperature as a partial flow of process air generated by other systems.

2. The device as claimed in claim 1, wherein fans, which are respectively driven by a Stirling engine, are arranged in sections of the air channel and positioned to move the heated air through the receiver.

3. The device as claimed in claim 1, wherein the heat exchanger has a structured surface on its side facing toward the sun and lamellae structured in the shape of a wedge on its fluidically effective side.

4. The device as claimed in claim 1, wherein surfaces coming into fluidic contact with flowing air are coated with artificial sharkskin.

5. The device as claimed in claim 1, wherein the collector comprises sectional parabolic mirrors.

6. The device as claimed in claim 1, wherein a plurality of air receivers in angled form converge on a round main collection tube at an acute angle, tangential entry points of mutually opposite air receivers being arranged offset in relation to the longitudinal axis of the main collection tube and offset above one another in relation to the horizontal transverse axis of the main collection tube.

7. The device as claimed in claim 1, wherein the collector comprises a trough collector.

8. The device as claimed in claim 1, wherein the collector comprises a Fresnel mirror collector field.

9. A method for air-based solar thermal generation of process heat in order to assist drying processes in a temperature range of from 300° C. to 700° C., having the following steps:
   a) heating by at least one elongated collector field in the form of a mirror system, the air in at least one air receiver by heating an inner-lying heat exchanger comprising ceramic, which is insulated from external air,
   b) promoting air movement in each air receiver by at least one fan driven by a Stirling engine,
   c) providing, in order to increase efficiency, air receivers having a different radiation concentration are arranged in series in sections, a first elongated collector of the at least one elongated collector forming a first solar field of concentrated solar radiation on a first air receiver of a first size, a second elongated collector of the at least one elongated collector forming a second solar field of concentrated solar radiation of a second air receiver of a second size, the first air receiver being larger than the second air receiver, wherein the air receivers include at least three receivers that are in an angled arrangement and heated by more than one solar field,
   d) adding solar-thermally generated hot air is added as a function of a respective temperature of the solar-thermally generated hot air as a partial flow of process air generated by other systems.

10. The method as claimed in claim 9, wherein surfaces coming into fluidic contact with flowing air are configured with artificial sharkskin.

11. The method as claimed in claim 9, wherein the collector comprises sectional parabolic mirrors.

12. The method as claimed in claim 9, wherein at least three air receivers having a different radiation concentration are arranged in series in sections.

13. The method as claimed in claim 9, wherein the collector comprises a trough collector.

14. The method as claimed in claim 9, wherein the collector comprises a Fresnel mirror collector field.

* * * * *